X0009415
J. Cooper.
Clover Huller.
Patented Feb. 20, 1836.
Section
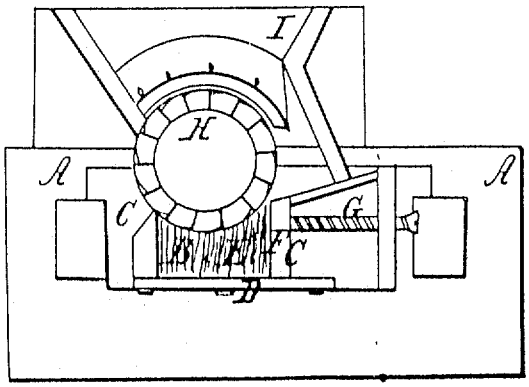
Perspective View
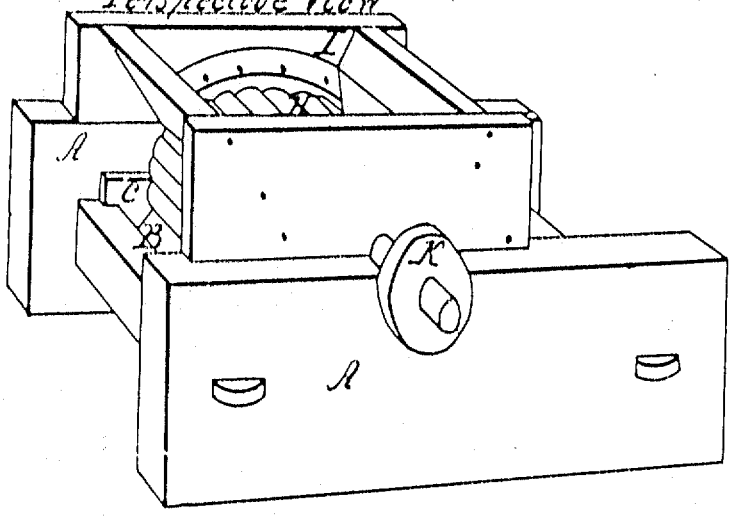
N. PETLAR. PHOTO-LITHOGRAPHER, WASHINGTON, D. C.

9415X

Feb. 20, 1836

James Cooper of Green County Ohio

Letters Patent

The Schedule referred to in these Letters Patent and making part of the
same containing a description in the words of the said James Cooper himself of
his improvement in the machine for Thrashing Clover and other Seed Be it known that I James Cooper of Green County, State of Ohio
have made ~~a new and useful~~ improvement in the machine for
thrashing out clover and other small seeds. which is described as
follows. reference being had to the annexed drawing of the same
making part of this Specification. This machine consists of the
following principal parts. 1 The frame. 2 The concave or bed.
3 The thrashing or rubbing cylinder. 4 The Hopper. 5. The gear
ing. 1. The frame (marked A in the annexed drawing is made similar
to the frame of a common Thrashing machine, of sufficient size
and strength to contain and support the machinery hereafter de
scribed. 2. The concave or bed B is made in the following man
ner. Make a Box C. as wide as the cylinder is long with a [illegible]
bottom D. fill this box with straw E. placed endwise: then [illegible]
a moveable board F. or piece of timber in one end of the box
against the straw and force it forward by screws G. or wedges, and to
compress the straw tight together. The ends of the straw next to the cylinder are then to be cut off in
such a manner as to form a concave, corresponding to the cylinder
and extending half round it, or thereabouts. This box and
concave are then placed under the cylinder in the frame.
The concave may also be formed by placing the cylinder in the
box and then inserting the straw through the bottom of the box
with the ends thereof resting against the circumference of the
cylinder which will form the concave without the necessity of
cutting it out. the moveable board is to be driven against
the straw by ~~means of~~ the screws or wedges, as before described
and secured, after which the lower ends of the straw are to be
cut off and a slide or board placed against the straw and 9415 X                                                    Feb 20, 1836

30 and secured in grooves, or by screws to keep the straw firmly in its
place. Instead of straw for the bed the material may be broom corn
used cut in fine splits, bristles, shanks of grass, whale bone split
or any similar material compressed in the manner before described
3. The Thrashing or rubbing cylinder H. is made by sawing paral
lel grooves, lengthwise the cylinder around its whole circumference
into which are inserted plates of metal and in front of each plate
the wood of the cylinder is cut away in order to form a notch, flute
or groove, and when the edges of the plates are worn down even with
the wood, the notches or grooves, may be renewed by again trimming
away the wood in front of the plate. 4. The hopper I. is made
in the usual manner. 5. The gearing consists of a pulley K. on
the end of the shaft of the thrashing cylinder, around which
passes a band leading to the pulley of the driving power.

Operation. The machine being put in motion by manual, horse
or other power, the seed to be rubbed out is put into the hopper
when it is struck or caught by the notches ~~flutes~~. or bars of the
cylinder and forced over the ends of the straw of the bed which
separates the seed from the hulls. What I claim as my inven
tion and which I desire to secure by letters Patent consists in the
before described mode of making the concave or bed, of straw, broom
corn, split or [illegible] bristles, split whale bone, or of other similar material
Also the mode of ironing the cylinder Witnesses,
Wm. P. Elliot
B. K. Morsell James Cooper.

947

6721

Drawing